Patented Oct. 4, 1949

2,483,986

UNITED STATES PATENT OFFICE 2,483,986

ALIPHATIC POLYENE GUANAMINES

Jack Theo Thurston, Cos Cob, Conn., assignor to American Cyanamid Company, New York, N. Y., a corporation of Maine No Drawing. Application August 30, 1941, Serial No. 409,155

2 Claims. (Cl. 260—249.5)

This invention relates to 2-substituted aliphatic polyene guanamines.

Several 2-substituted guanamines have been prepared in which an alkyl radical such as methyl is attached to the 2 carbon atom of the 4,6-diamino-1,3,5-triazine ring. According to the present invention, I have found that a very important series of 2-substituted guanamines can be prepared in which the substituent is a polyunsaturated aliphatic radical. Such compounds are capable of forming resins with formaldehyde as are most guanamines but the resins possess the important property of drying by oxidation so that they can be incorporated in coating compositions containing drying oils. In general, the compounds of the present invention may be represented by the formula:

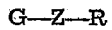

G—Z—R in which G is a guanamine radical having a free valence on the two carbon atom of the triazine ring, Z is a polyunsaturated aliphatic radical, and R is hydrogen, alkyl, aryl, or another guanamine radical having a free valence on the 2 carbon atom of the triazine ring. The present invention is not limited to any particular method of making the guanamines, but I have found that the commercially most attractive method is by reaction of a biguanide with an ester of a polyunsaturated aliphatic carboxylic acid. Equally good results may, however, be obtained by using the corresponding acid chloride instead of the ester.

When no substitute is desired on the amino groups of the guanamine radical, the reaction is with unsubstituted biguanide. However, N-substituted products may be obtained by reacting the corresponding N-substituted biguanide, such as N-methyl biguanide, N-allyl biguanide, and the like.

It is preferable to carry out the reaction in solution in an organic medium and when esters are used, alcohols are very effective solvents, the lower monohydric alcohols, such as methanol, ethanol, the ethyl ether of ethylene glycol, and the like, being preferable. It is advantageous to use an alcohol corresponding to the alcohol radical of the esters in order to avoid separation problems. When the acid chlorides are used, solvents or diluents are also desirable, in this case inert organic medium or a mixture of water and inert organic medium. Water alone tends to decrease the yield and is less desirable.

Among the poly unsaturated acids which can be used in the preparation of esters or acid chlorides are sorbic acid, linoleic acid, 9,11- and 9,12-octadecadienoic acids, the acids from soy bean oil and tung oil, and various isomerized compounds which can be obtained by thermal treatment of unsaturated acids. Such thermal treatment frequently results in dimerization as well as isomerization, the mechanism and typical representatives being described by Bradley and Johnston, Industrial and Chemical Engineering, volume 32, beginning at page 802. When esters or acid chlorides of dimerized poly unsaturated acids are employed, a guanamine normally results.

It is an advantage of the present invention that pure esters or acid chlorides need not be employed. On the contrary, mixed esters and acid chlorides such as those which are obtainable from naturally occurring fats and oils give products of substantially the same properties and are, of course, much cheaper. Such mixtures also permit preparing products which can be transformed into resins of various degrees of reactivity in airdrying to make constituents of various drying oil coating compositions.

The invention will be described in greater detail in conjunction with the following specific examples which describe the preparation of representative members of the present invention. The parts are by weight.

EXAMPLE 1

*Guanamines from soy bean acid esters*

Ten parts of biguanide are dissolved in 80 parts of methanol and 40 parts of ethanol were added, whereupon 31 parts of the methyl esters of soy bean acids were introduced. After standing for some time at room temperature the guanamine crystallizes, the alcohol was removed by distillation at reduced pressure, yielding 25 parts or 72% of guanamines. The residue was recrystallized first from methanol and then twice from acetone and the purified product melted at 102° C.

EXAMPLE 2

*Guanamines from tung oil acid*

Twenty-five parts of biguanide were dissolved in 160 parts of methanol and 50 parts of the methyl esters of tung oil acids added. An additional 35 parts of methanol and 100 parts of ethanol were then added to complete the solution. On standing at room temperature the reaction became complete and half of the alcohol was removed by distillation under reduced pressure. Thereupon the solution remaining was diluted with three times its volume of water and filtered. After acidification to transform the guanamine into its hydrochloride, the yield of the product was approximately theoretical.

EXAMPLE 3

*Linoleoguanamine*

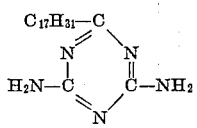

To a suspension of 50 parts of biguanide in 360 parts of acetone were added 74.5 parts of linoleyl chloride, the addition being gradual and the temperature of the reaction mixture being maintained between 0 and 5° C. After all of the linoleyl chloride had been introduced, the reaction mixture was maintained for an additional hour at the same low temperature and then allowed to warm up gradually to room temperature, stirring being continuously maintained. This mixture was stirred for a considerable period of time at room temperature then heated to boiling under a reflux for an hour and filtered hot. The filter cake was then twice slurried with 200 parts of acetone and heated to the boiling point. The combined filtrates were then cooled by an ice bath and 54 parts of guanamine crystallized and was removed by filtration. The filtrate was then concentrated and an additional 24 parts of product was obtained giving an overall yield of 90% of the theoretical. After a recrystallization from acetone the product melted at 94° C.

EXAMPLE 4

*Octadecadienoguanamine*

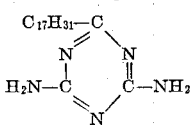

To a solution of 10 parts of biguanide and 80 parts of methanol was added 35 parts of a mixture of the methyl esters of 9,11- and 9,12-octadecadienoic acids together with 8 parts of ethanol. After standing for some time at room temperature the alcohol was removed under reduced pressure, the residue after clarification with a decolorizing composition was recrystallized from acetone. The yield of the product was about 80%, and it melted at 75–80° C. The product was very susceptible to air oxidation and tended to resinify on standing in the air.

EXAMPLE 5

*5-n-hexyl-6-(Δ2-n-octenyl)-3-cyclohexene-di(1,2)heptyl-guanamine*

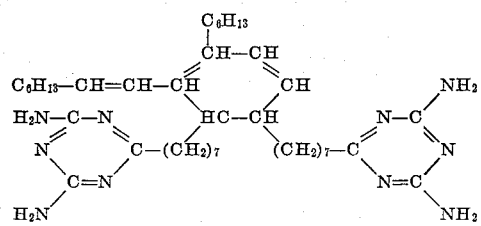

Thirty-one parts of distilled dimerized methyl esters of soy bean oil prepared as given in Industrial Engineering Chemistry 32, 806 (1940) and 33, 86 (1941) was added to a solution of 10 parts of biguanide in 80 parts of methanol and 90 parts of ethanol. After standing for about a day, a small amount of an insoluble material was removed by filtration and the filtrate was evaporated. The residue was extracted with 600 parts of acetone which yielded 16 parts of a crystalline product that was recrystallized from ethyl acetate. After thoroughly drying the colorless product melted at 75–78° C. and was identified as a guanamine having the above formula.

EXAMPLE 6

*2-carboxy-6-(ω-carbomethoxy-α-n-nonenyl)-3-n-butyltetrahydrobenzoguanamine*

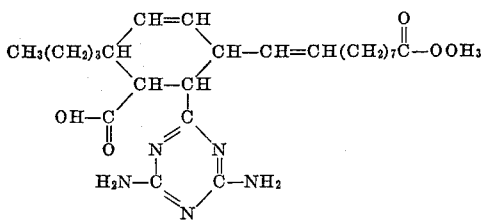

*2-carboxy-6-(ω-carbomethoxy-n-heptyl-3-α-n-hexenyltetrahydrobenzoguanamine*

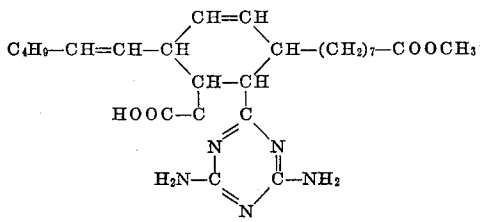

305 parts of the methyl α and β eleostearate-maleic anhydride adducts prepared by condensing the methyl ester of tung oil acids with maleic anhydride by the Diels-Alder reaction was refluxed for three to four hours with 403 parts of methanol. The free acid was then converted to the sodium salt by slowly adding 15.4 parts of dissolved sodium in methanol with vigorous stirring. 70 parts of biguanide were added and the mixture allowed to stand at room temperature until reaction appeared complete. The solution darkened somewhat on the addition of the biguanide. The guanamine was isolated by recovering the methanol by evaporation and acidifying a water solution of the product with hydrochloric acid. After extracting several times with carbon tetrachloride, the guanamine salt which formed an immiscible layer, was neutralized with ammonium hydroxide and the insoluble product washed three times with water and dried. The guanamine was obtained as a light brown brittle product which softens from 70–95° C., the yield being about 64%.

EXAMPLE 7

*Sorboguanamine*

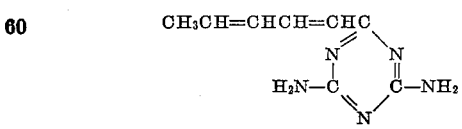

Twenty-two parts of biguanide were dissolved in 150 parts of methanol, the solution filtered and 31.5 parts of methyl sorbate introduced. After standing overnight crystals formed which were recovered by filtration, and the filtrate concentrated to crystallize out further amounts of the guanamine. The crude guanamine was then recrystallized from ethyl acetate, being obtained in the form of light yellow crystals having a melting point of 220° C. The yield was approximately 80%.

I claim:

1. A method of preparing an unsubstituted aliphatic polyene guanamine which comprises dissolving a biguanide in a solvent therefor, adding thereto a lower alkyl ester of a polyolefinic aliphatic carboxylic acid, carrying the resultant reaction to substantial equilibrium, and isolating the resultant aliphatic polyene guanamine.

2. A method of preparing a 2-substituted aliphatic polyene guanamine which comprises dissolving biguanide in a solvent therefor, adding thereto an ester of a polyolefinic aliphatic carboxylic acid, carrying the resultant reaction to substantial equilibrium, and isolating the resultant 2-substituted guanamine.

JACK THEO THURSTON.

REFERENCES CITED

The following references are of record in the file of this patent:

UNITED STATES PATENTS

| Number | Name | Date |
|---|---|---|
| 2,258,130 | Brunson | Oct. 7, 1941 |
| 2,437,691 | Grun | Mar. 16, 1948 |

OTHER REFERENCES

Centralblatt, 1907, (II), page 706.

Utilization of Fats, by H. K. Dean, 1938, published by A. Harvey, p. 277.

Fats and Oils, by Kirslhenbauer (1944), pp. 125, 126.

Annalen, page 167 (376).